United States Patent
Haasler et al.

(10) Patent No.: US 12,515,279 B2
(45) Date of Patent: Jan. 6, 2026

(54) ASSEMBLY FOR MATERIAL PROCESSING USING A LASER BEAM, IN PARTICULAR FOR LASER DRILLING

(71) Applicant: Fraunhofer-Gesellschaft zur Förderung der angewandten Forschung e.V., Munich (DE)

(72) Inventors: Dennis Haasler, Aachen (DE); Johannes Finger, Aachen (DE)

(73) Assignee: FRAUNHOFER-GESELLSCHAFT ZUR FÖRDERUNG DER ANGEWANDTEN FORSCHUNG E. V., Munich (DE)

( * ) Notice: Subject to any disclaimer, the term of this patent is extended or adjusted under 35 U.S.C. 154(b) by 784 days.

(21) Appl. No.: 17/796,444

(22) PCT Filed: Jan. 28, 2021

(86) PCT No.: PCT/EP2021/051977
§ 371 (c)(1),
(2) Date: Jul. 29, 2022

(87) PCT Pub. No.: WO2021/152008
PCT Pub. Date: Aug. 5, 2021

(65) Prior Publication Data
US 2023/0339047 A1    Oct. 26, 2023

(30) Foreign Application Priority Data
Jan. 31, 2020 (DE) .................... 10 2020 201 207.5

(51) Int. Cl.
| B23K 26/388 | (2014.01) |
| B23K 26/046 | (2014.01) |
| B23K 26/06 | (2014.01) |
| B23K 26/0622 | (2014.01) |
| B23K 26/082 | (2014.01) |

(52) U.S. Cl.
CPC .......... *B23K 26/388* (2013.01); *B23K 26/046* (2013.01); *B23K 26/0624* (2015.10);
(Continued)

(58) Field of Classification Search
CPC ........................... B23K 26/388; B23K 26/046; B23K 26/0624; B23K 26/0643; B23K 26/0648; B23K 26/082
See application file for complete search history.

(56) References Cited

U.S. PATENT DOCUMENTS 6,433,303 B1 * 8/2002 Liu .................... B23K 26/0624
219/121.75
8,237,082 B2 * 8/2012 Beck .................... B23K 26/389
219/121.61
(Continued)

FOREIGN PATENT DOCUMENTS

| CN | 105436703 A | 3/2016 |
| DE | 10054853 A1 | 8/2002 |

(Continued)

OTHER PUBLICATIONS

International Search Report with English translation dated May 5, 2021.
(Continued)

*Primary Examiner* — Elizabeth M Kerr
*Assistant Examiner* — Keith Brian Assante
(74) *Attorney, Agent, or Firm* — Renner, Kenner, Grieve, Bobak, Taylor & Weber, Co. LPA

(57) ABSTRACT

The present invention relates to an assembly for material processing using a laser beam, in particular for laser drilling, comprising a dynamic deflection device (AE) for the laser beam (LS), and an optical assembly, with which a laser beam (LS) exiting the deflection device (AE) is focused onto a processing plane (W). Along an optical axis, the optical
(Continued)

assembly has a first optical system (OS1) and a second optical system (OS2), which are designed and arranged such that the laser beam (LS) forms an intermediate focus (ZF) between the first and the second optical system (OS1, OS2), and intersects the optical axis when entering the first optical system (OS1) at an angle to the optical axis and at a distance therefrom between the second optical system (OS2) and the processing plane (W). The suggested assembly has a simple, stable structure, with which efficient ablation of large and deep boreholes or cuts in a workpiece is enabled.

9 Claims, 1 Drawing Sheet

(52) U.S. Cl.
CPC ...... *B23K 26/0643* (2013.01); *B23K 26/0648* (2013.01); *B23K 26/082* (2015.10)

(56) References Cited

U.S. PATENT DOCUMENTS

| | | | |
|---|---|---|---|
| 9,873,628 B1* | 1/2018 | Haloui | C03B 33/0222 |
| 2004/0017429 A1 | 1/2004 | Liu et al. | |
| 2008/0013182 A1* | 1/2008 | Ferber | B23K 26/0648 |
| | | | 359/619 |
| 2011/0180521 A1* | 7/2011 | Quitter | B23K 26/046 |
| | | | 219/121.73 |
| 2017/0197279 A1* | 7/2017 | Milne | B23K 26/0643 |
| 2018/0325727 A1 | 11/2018 | Sondermann et al. | |
| 2019/0076958 A1* | 3/2019 | Izumi | B23K 26/707 |
| 2019/0151993 A1* | 5/2019 | Subkhangulov | B23K 26/38 |
| 2019/0255649 A1* | 8/2019 | Kurosaki | B23K 26/0622 |
| 2021/0001427 A1* | 1/2021 | Ly | B23K 26/0613 |
| 2021/0229213 A1* | 7/2021 | Traub | B23K 26/362 |
| 2021/0245303 A1* | 8/2021 | Matsumoto | B23K 26/0624 |
| 2022/0048135 A1* | 2/2022 | Brookhyser | B23K 26/0648 |

FOREIGN PATENT DOCUMENTS

| | | |
|---|---|---|
| DE | 102018208752 A1 | 12/2019 |
| EP | 1082883 A1 | 3/2001 |
| EP | 1188509 B1 | 11/2006 |

OTHER PUBLICATIONS

German Examination Report with English translation dated Jan. 31, 2020.

* cited by examiner

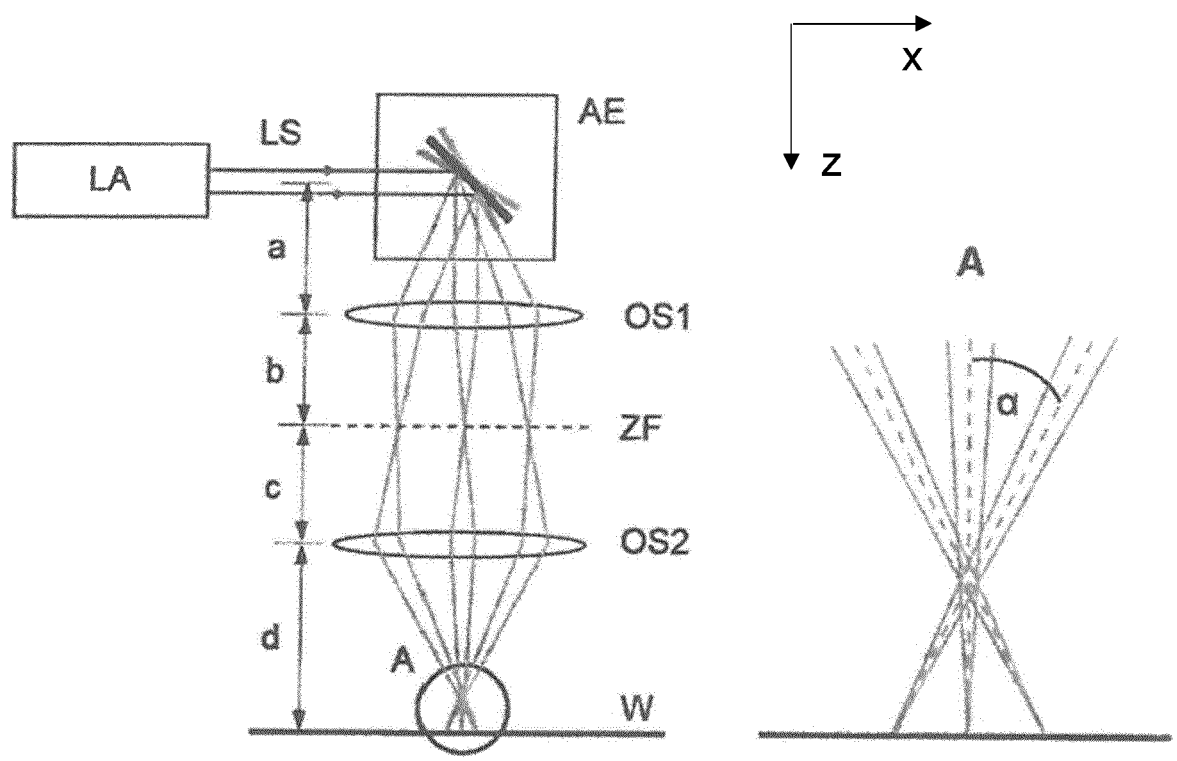

ASSEMBLY FOR MATERIAL PROCESSING USING A LASER BEAM, IN PARTICULAR FOR LASER DRILLING

TECHNICAL FIELD

The present invention relates to an assembly for material processing using a laser beam, in particular for laser drilling, comprising a dynamic deflection device for the laser beam, which is designed to deflect the laser beam in two directions perpendicularly to each other, and an optical assembly, with which a laser beam exiting the deflection device can be focused onto a processing plane.

In material processing techniques using short and ultra-short laser pulses for laser beam cutting or laser drilling, it is not possible to create steep wall angles with typical processing parameters by perpendicular irradiation. The achievable wall angle of the ablation flanks is typically in the range up to 85°. This is due to the reduction in pulse intensity when projecting onto the inclined ablation flank, as a result of which the ablation is stopped after a critical angle. However, for many applications this is not desirable, because for example no vertical cut flanks, or only conical boreholes are possible. In deep ablation, cutting or drilling, the limitation of the wall angle also results in a limitation of the achievable aspect ratio (ablation depth relative to diameter at surface).

RELATED ART

For drilling and precision cutting with a laser beam, there are special optical devices available with which various procedures can be carried out to line up the laser beam so that a cylindrical or even negatively conical borehole can be produced. With these optical devices, the wall angle that is created by a perpendicularly incident beam is compensated for by the incidence of the laser beam on the workpiece. In the case of precision cutting, a relative movement between the optical system and the workpiece is further initiated during drilling, thereby creating a cut with the same width as the borehole diameter. The available optical devices can be divided into two groups according to the functional principle of the method used to guide the laser beam. In the first group, the beam is guided with the aid of rotating optical elements, for example rotating prisms, cylindrical lenses or optical wedges. The second group uses rotatable mirrors for full beam guidance, i.e. for offset, incidence and deflection.

One classic application field of laser drilling is for creating extremely accurate microboreholes having diameters of some 10 to 100 μm in thin foils with thickness usually considerably less than 1 mm. Drilling is often carried out in a multi-pass cutting process along the borehole wall, so full ablation does not take place. In such cases, the drilling optical systems are often designed for a maximum borehole diameter in the order of 1 mm. For larger drilling diameters, the size of the rotatable optical elements must be increased, wherein the deflection speed is reduced non-linearly.

EP 1 188 509 B1 discloses an optical apparatus for drilling using a laser beam, in which the angle of attack and deflection can be adjusted separately from each other to define a trepanning radius. The assembly has a deflection device with two deflection mirrors, with which the optical distance of at least one of the deflection mirrors can be changed parallel to the optical primary axis relative to the focussing optics. This enables the laser beam to be directed onto the focussing optic at different angles, to that in turn different angles of attack are produced depending on the positioning of the deflection mirror. The focussing optic in this assembly is formed by a focussing lens, through which the laser beam is focussed on the processing plane. In this arrangement, the angle of attack cannot become greater than the deflection angle of the deflection device. Consequently, large angle of attacks can only be realised for large contours.

SUMMARY OF THE INVENTION

The object of the present invention consists in describing an assembly for material processing using a laser beam, with which large and deep boreholes or cuts may be made with a simple and consequently highly inexpensive and stable construction, and which also enables relatively small boreholes with a large angle of attack.

The object is solved with the assembly according to claim 1. Advantageous variants of the assembly are subject of the dependent claims or can be discerned from the following description and the exemplary embodiment.

The suggested assembly includes a dynamic deflection device for the laser beam, which is designed to deflect the laser beam into two directions oriented perpendicularly to each other, and an optical assembly between the deflection device and a processing plane, with which a laser beam exiting the deflection device is focussed onto the processing plane. The dynamic deflection device may be for example a two-dimensional galvanometer scanner. Of course, other types of such deflection devices for laser beams may also be used. The optical assembly for focussing the laser beam exiting the deflection device onto the processing plane is equipped with at least two optical systems along an optical axis of the optical assembly. In this context, an optical system is understood to be an assembly of one or more beam-guiding and/or beam-shaping optical elements, for example one or more lenses. The optical axis represents the axis of symmetry of the optical assembly on which an entering laser beam passes through the optical assembly without deflection. In the suggested assembly, the first and second optical systems are designed and arranged such that the laser beam which is focussed on the processing plane forms an intermediate focus between the first and the second optical systems, and when entering the optical system at an angle ($\neq 0°$) to the optical axis and at a distance therefrom intersects the optical axis between the second optical system and the processing plane. The entry into the optical system at an angle to the optical axis and at a distance therefrom is caused by the dynamic deflection device and represents the desired mode of operation of the assembly for producing a cut or borehole in a workpiece, of which a surface region to be processes in arranged in the processing plane, in such manner as to achieve an incidence of the laser beam (angle>0° to the surface normal) with respect to the surface region of the workpiece. In the present patent application, the entry of the laser or laser beam at an angle to the optical axis and at a distance therefrom, and the intersection of the optical axis by the laser beam are understood in known manner to mean that the beam axis of the laser beam extends at an angle to the optical axis and at a distance therefrom or crosses the optical axis.

In the suggested assembly, an angular offset with respect to the optical axis of the optical assembly is produced with the dynamic deflection device. Thus, the laser impinges on the first optical system at an angle to the optical axis and at a distance therefrom, and is focussed onto an intermediate focus between the first and second optical systems by the first optical system. The laser beam diverges after the intermediate focus and is then focussed on the processing plane or workpiece surface by the second optical system. In the suggested assembly, the offset of the laser beam from the optical axis leads to the incidence of the laser beam with a helical point above the processing plane or the focus. In this way, an irradiation direction suitable for creating the intended steep wall angle of a borehole is achieved in the processing plane or on the surface of the workpiece. With the suggested optical structure, an angular deflection of the laser beam is thus split into an offset and an incidence or irradiation angle. The angle of attack is proportional to the offset from the optical axis, and the proportionality factor depends on the optical structure and/or the dimensions thereof in each case. By means of the helical point in which the laser beam intersects the respective optical axis above the processing plane, it is also possible to create small boreholes with a large angle of attack.

Unlike the known use of a relay system, in the suggested assembly, through the use of two optical systems with defined distances between them, the laser irradiation is already focussed on the processing plane, in such a way that when the laser beam enters the first optical system at an angle to the optical axis and at a distance therefrom it intersects the optical axis between the second optical system and the processing plane.

In contrast thereto, a relay system merely images the deflection plane onto a plane behind the optical system. The focussing of the laser radiation can then be achieved via an additional focussing optic, whose entrance pupil is positioned in the imaged deflection plane. This corresponds to a conventional structure consisting of a deflection device and focussing lens, in which the optical axis is not intersected between the focussing optic and the processing plane. In this case, the relay system merely serves to separate the deflection device and the focussing optics from one another spatially or for inserting spatial filters in the intermediate focus.

The diameter of a borehole to be produced and the scanning speed are determined by the deflection and rotating speed of the dynamic deflection device. Both the proportionality factor and the focus diameter are set or defined on the basis of the spacings between the two optical systems, between the deflection device and the first optical system, and between the second optical system and the processing or focussing plane and choice of the focal lengths of the respective optical systems. Boreholes may be made using the suggested assembly either by cutting or by full ablation. Accordingly, the laser beam may be guided by corresponding actuation of the dynamic deflection device to travel over the contour of the borehole and remove material layer by layer in multiple passes. This multi-pass cutting of the boreholes corresponds to the typical method in trepanning optics. On the other hand, layer ablation of the entire borehole surface, i.e. full ablation, may also be performed by scanning the cross-sectional surface of the borehole in different scanning movements. In this process, the surface may be scanned variously by corresponding actuation of the dynamic deflection device, for example in concentric circles or in a spiralling motion. Other scan paths are also possible for this full ablation.

With the suggested assembly, it is possible to create positively conical, cylindrical, and also negatively conical boreholes having diameters of up to several mm. By full ablation it is possible to advance the focussing plane into the borehole without the laser radiation being shaded in the process. Moreover, three-dimensionally formed boreholes, that is to say boreholes with non-cylindrical shape, may also be produced. Examples are the creation of drilling funnels, the creation of hourglass-shaped boreholes or the creation of boreholes with a de Laval nozzle shape. By using a movement of the workpiece relative to the suggested assembly, the assembly may also be used for helical cutting. Additionally, this also makes it possible to perform surface ablation with vertical ablation flanks or even undercuts when microstructuring.

In a preferred variant, the first optical system and the second optical system are each made up of a lens or lens arrangement. The spacings between the lenses or optical systems but also their distances from the deflection device and the processing plane may be specified fixedly in this context. In an advantageous variant, one or more of these spacings may also be adjustable by suitable mechanical positioning elements or displacement mechanisms on one or both optical systems and/or the deflection device.

Further components for beam guidance and/or beam shaping may also be arranged in the beam path of the laser beam in addition to the deflection device and the optical assembly which is adjacent to the deflection device. Thus for example, the suggested assembly may include a telescope in the beam path in front of the deflection device, with which the beam diameter of the laser beam and therewith the focus diameter can be adapted in the processing plane as well. An optical device for prefocussing the laser beam before the deflection device may also be installed, also to make it possible to adapt the focus diameter in the processing plane as well. The capability also exists to rotate the laser beam while processing the material, by means of suitable rotating optical elements—e.g., a DOVE prism rotating about its own longitudinal axis—, as is known from assemblies for helical drilling using laser radiation.

In a further advantageous variant, one or more suitable positioning elements are provided to enable the focussing plane to be shifted or adjusted perpendicularly to the optical assembly during processing. Such a Z-shift of the focussing plane may be effected by a movement of a mechanical z-axis or by shifting the optical elements of the first and/or second optical system along the optical axis of the optical assembly. In the suggested assembly, elements for generating a linear, circular or statistically distributed polarisation of the laser radiation may also be installed in the beam path of the laser beams. The possibly also exists to rotate the polarisation at the same time in each case using suitable optical elements such as a $\lambda/2$ waveplate, $\lambda/4$ waveplate, DOVE prism (synchronous, asynchronous).

When material processing with the suggested assembly, one or more processing and/or laser parameters may be adapted to the process workflow during the process. In the case of the laser parameters, this applies for the pulse energy, the pulse duration and the repetition rate, regarding the process parameters it applies for the scan geometry, the scanning speed, the speed of the Z-shift, the course of the Z-shift and waiting times between individual processing phases. In addition, process gases such as air, inert gas or active gas may be used in known manner during processing, for example through the use of a crossjet or a coaxial nozzle, to achieve improved removal of the ablation particles from the interaction area with the laser radiation.

With the suggested method, large and deep boreholes or cuts may be created with a very inexpensive and stable construction. The suggested assembly can be retrofitted in many existing processing and structuring systems. The assembly enables full ablation of the borehole cross-section or cutting by means of spiral or circular traverses, each with an adapted angle of attack. In the simplest case, the optical assembly has only two lenses, with the result that only minor losses occur in the optical beam path. Since no moving components are arranged in the optical assembly, the suggested assembly has a simple, stable and inexpensive structure. The size of the boreholes that can be drilled with the assembly is only limited by the diameters of the two optical systems. With helical cutting, greater cutting depths are also possible due to a larger cutting kerf. The suggested assembly can be used for drilling in turbomachine building, electronics manufacturing or semiconductor technology, for example, and for helical cutting in precision mechanics, semiconductor technology or also in toolmaking and aircraft construction, for example.

BRIEF DESCRIPTION OF THE DRAWING

In the following text, the suggested assembly will be explained again, in greater detail, with reference to an exemplary embodiment thereof and in conjunction with the drawing. In the drawing:

FIG. 1 shows an example of an embodiment of the suggested assembly.

WAYS OF IMPLEMENTING THE INVENTION

With the suggested assembly, a laser beam is focussed onto a workpiece surface by means of a deflection device via an optical assembly in order to remove material from said workpiece surface, in particular in order to create boreholes or cuts in the workpiece. FIG. 1 is a schematic representation of an exemplary structure of the suggested assembly. In this representation, collimated laser radiation LS from a laser beam source LA is deflected by the deflection unit AE into two directions (X- and Y-direction) extending perpendicularly to one another. Said deflection unit AE may be for example a two-dimensional galvanometer scanner. The FIGURE shows three positions of one of the mirrors of the deflection unit AE with the beam course of the laser radiation resulting therefrom. In two of the three positions represented, the laser radiation impinges at an angle to the optical axis on the first optical system OS1, in the present example a focussing lens. In the middle position of the represented mirror of the deflection unit AE the laser radiation propagates through the first optical system OS1 along the optical axis. At distance b of the focal length of the first optical system OS1, an intermediate focus ZF is realised. Then the diverging laser radiation is focussed on the workpiece W through the second optical system OS2. The second optical system OS2 in this example is also formed by just a single focussing lens. The spacings a, b, c and d between the deflection unit AE and the first optical system OS1, between the first optical system OS1 and the intermediate focus ZF, between the intermediate focus ZF and the second optical system OS2 and between the second optical system OS2 and the workpiece surface W, which in this example corresponds to the processing plane, are chosen such that the laser beam intersects the optical axis before impinging on the workpiece surface W. This is illustrated in larger scale in an enlarged view of section A in the right part of the FIGURE. The offset of the laser beam from the centre line or optical axis, which is formed during the pass through the first optical system OS1 with corresponding mirror position, causes the laser beam to be incident with an angle $\alpha$ and a helical point above the focussing plane. The two optical systems OS1, OS2 map a virtual point with virtual deflection above the deflection unit AE and so result in an alignment in a direction advantageous for the conicity of the desired borehole.

Through corresponding dynamic deflection of the laser beam LS with the deflection unit AE, it is thus possible to create the desired borehole. The angle of irradiation on the workpiece surface is proportional to the respective offset of the laser beam between the two optical systems OS1, OS2 from the centre line or optical axis. Both the proportionality factor and the focus diameter can be adjusted by changing the spacings a, b, c and d and suitable selection of the focal lengths of optical systems OS1, OS2.

With the following exemplary dimensioning of the assembly, it is possible for example to produce a borehole with a diameter of 500 µm in a workpiece made from 5 mm thick nickel-base alloy. In this context, a pulse energy of ~1 mJ is used with a focus diameter of 40 µm and a pulse duration <20 ps, and full ablation by spiralling takes place. The parameters shown in FIG. 1 for this case are chosen as follows:

a=50 mm
b=500 mm
c=500 mm
d=80 mm
Focal length of lens OS1: 500 mm
Focal length of lens OS2: 70 mm

LIST OF REFERENCE SIGNS

AE Deflection unit
LA Laser beam source
LS Laser beam
OS1 First optical system
OS2 Second optical system
W Workpiece surface
ZF Intermediate focus
a-d Spacings

The invention claimed is:
1. Assembly for material processing using a laser beam, in particular for laser drilling, with
   a dynamic deflection device (AE) for the laser beam (LS), which is designed to deflect the laser beam (LS) into two directions extending perpendicularly to each other, and
   an optical assembly, with which a laser beam exiting the deflection device (AE) is focused onto a processing plane (W),
   wherein the optical assembly includes a first optical system (OS1) and a second optical system (OS2) along an optical axis of the optical assembly, which are designed and arranged such that the laser beam (LS) forms a intermediate focus (ZF) between the first and second optical systems (OS1, OS2), and when entering the first optical system (OS1) at an angle to the optical axis and at a distance therefrom intersects the optical axis between the second optical system (OS2) and the processing plane (W).
2. Assembly according to claim 1, characterized in that
   one or more positioning elements are attached to one of the two optical systems (OS1, OS2) or to both optical systems (OS1, OS2), with which a spacing between the two optical systems (OS1, OS2) and/or a spacing between the first optical system (OS1) and the deflection unit (AE), and/or a spacing between the second optical system (OS2) and the processing plane (W) can be set or changed.

3. Assembly according to claim 1, characterized in that a telescope is arranged in front of the deflection device (AE) in the beam path of the laser beam (LS), with which a beam diameter of the laser beam (LS) can be changed.

4. Assembly according to claim 1, characterized in that an optical device for pre-focusing the laser beam (LS) is arranged in front of the optical assembly or the deflection device (AE) in the beam path of the laser beam (LS).

5. Assembly according to claim 4, characterized in that the optical device for pre-focusing is designed in such manner that it enables a variable pre-focusing of the laser beam (LS).

6. Assembly according to claim 1, characterized in that the optical assembly includes one or more positioning elements, with which a focusing plane of the laser beam (LS) can be shifted along the optical axis of the optical assembly during the material processing.

7. Assembly according to claim 1, characterized in that the optical assembly includes at least one element for influencing the polarization, by which a polarization advantageous for the material processing can be set.

8. A method for creating a borehole by full ablation in layers, comprising:
   using the assembly according to claim 1 in which a laser beam passes over the entire borehole cross section in each case, thereby creating the borehole by full ablation in layers.

9. A method for creating a borehole, comprising
   using the assembly according to claim 1; and
   cutting out a borehole contour by means of spiral or circular traverses with the laser beam.

* * * * *